United States Patent [19]

Vetter et al.

[11] Patent Number: 4,494,373
[45] Date of Patent: Jan. 22, 1985

[54] FAIL SAFE ROCKET MOTOR

[75] Inventors: Ronald F. Vetter; Theodore A. Hicks; Warren R. Compton, all of Ridgecrest, Calif.

[73] Assignee: The United States of America as represented by the Secretary of the Navy, Washington, D.C.

[21] Appl. No.: 378,580

[22] Filed: May 17, 1982

[51] Int. Cl.³ .............................................. F02K 9/00
[52] U.S. Cl. .................................. 60/253; 60/39.47
[58] Field of Search .............. 60/253, 254, 255, 39.47

[56] References Cited

U.S. PATENT DOCUMENTS

| | | | |
|---|---|---|---|
| 2,175,071 | 10/1939 | Walker | 220/72 |
| 2,787,397 | 4/1957 | Radford | 220/5 |
| 3,175,497 | 3/1965 | Head | 102/98 |
| 3,265,310 | 8/1966 | Cohen | 239/201 |
| 3,440,820 | 4/1969 | Caveny | 60/253 |
| 3,499,283 | 3/1970 | Simpkins | 60/39.47 |
| 3,664,133 | 5/1972 | Iwanciow et al. | 60/255 |
| 3,713,395 | 1/1973 | Carpenter et al. | 60/255 X |
| 3,970,208 | 7/1976 | Raes | 220/3 |

FOREIGN PATENT DOCUMENTS

| | | | |
|---|---|---|---|
| 2299616 | 10/1976 | France | 60/255 |
| 129675 | 7/1919 | United Kingdom | 60/255 |
| 992078 | 5/1965 | United Kingdom | 60/255 |

*Primary Examiner*—Louis J. Casaregola
*Assistant Examiner*—Donald E. Stout
*Attorney, Agent, or Firm*—Robert F. Beers; W. Thom Skeer; Stephen J. Church

[57] ABSTRACT

In a rocket motor having an insulative coating on selected portions of the exterior casing, one or more ribs are used to structurally strengthen portions of the casing and to reinforce thermal stress patterns which will cause failure venting at a predetermined point of the rocket motor as a cook-off safety feature.

4 Claims, 3 Drawing Figures

FAIL SAFE ROCKET MOTOR

BACKGROUND OF THE INVENTION

1. Field of the Invention

This invention relates to rocket motors. More particularly, this invention relates to a solid propellant rocket motor. Additionally, this invention relates to a solid propellant rocket motor which produces mild burning reactions rather than explosions when exposed to external fires.

2. Description of the Prior Art

Navy carrier operations especially provide the potential for aircraft fuel fires to occur in the vicinity of weapons and ordnance. Many rocket motors react after about one minute of exposure to external fires and flames. The reaction can vary from a mild burning to a violent case rupture.

Past efforts to improve the heat resisting capability of ordnance items have included placing a thermal barrier on the exterior of the rocket motor casing or warhead. By thermal insulation of the rocket motor propellant or explosive, the length of time the ordance item can be exposed to fire without reaction is increased. If the fire is not extinguished within a short period of time, the internal temperature will increase and the ordnance item may ignite and explode.

Explosion and violent rupture of a heat weakened motor can occur when the propellant grain is ignited along the central void in the grain. If combustion can be limited to the outside of the grain and properly vented, the severity of the reaction is lessened.

SUMMARY OF THE INVENTION

This invention overcomes the problems of the prior art by providing a rocket motor resistant to violent explosions. While portions of the rocket motor are structurally strengthened and thermally protected, other selected stress points in the casing are left unprotected. This permits buckling of the casing at the unprotected point and a venting of the rocket motor can occur. By proper venting, a violent rupture and explosion can be averted.

OBJECTS OF THE INVENTION

Accordingly, it is an object of this invention to provide an improved solid propellant rocket motor.

A further object of this invention is to provide a fire resistant rocket motor which may be safely used in areas prone to fires. Another object of this invention is to provide a rocket motor which will undergo a small-locus case rupture and produce a mild burning reaction to prevent a dangerous build-up of interior pressure.

These and other objects of the invention will become more readily apparent from the ensuing specification when taken with the drawings.

DESCRIPTION OF THE PREFERRED EMBODIMENT

Figure 1:
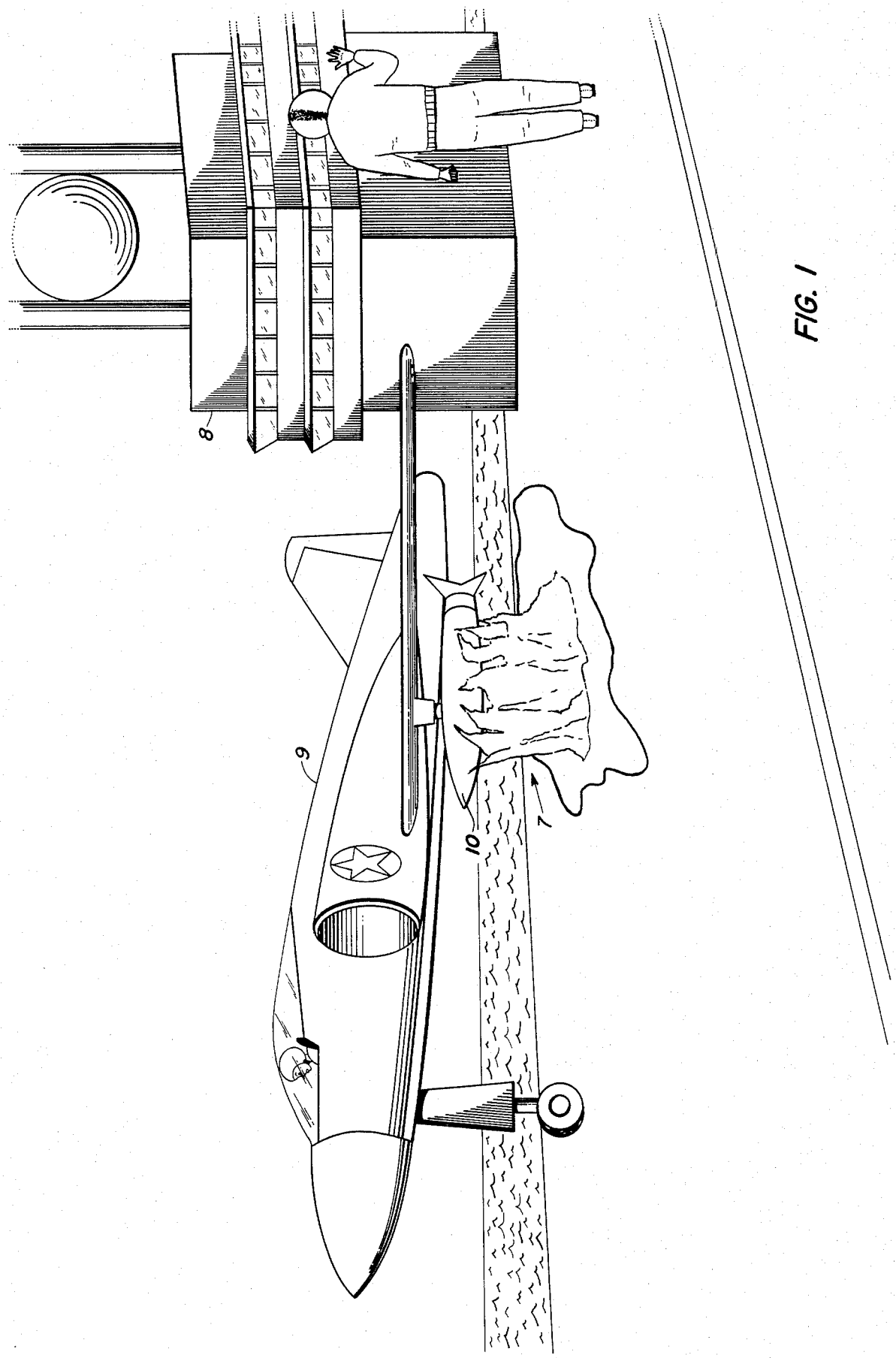
FIG. 1 is a view of the device shown in its operational environment.

Referring to FIG. 1, a rocket motor 10 is seen mounted under an aircraft aboard a ship 8. In this environment, aircraft fuel spillage can result in occasional fires as shown at 7. Rocket motor 10 can then endanger the crew and damage the ship, if it should react violently to a fire.

Figure 2:
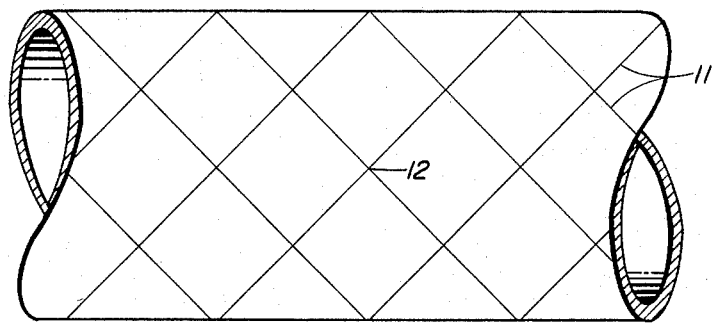
FIG. 2 is a view of the rocket motor case sector under thermally induced compression showing a pattern of stress "lines"

Referring to FIG. 2, a portion of rocket motor 10 is shown represented by a cylinder. When such a cylinder is subjected to longitudinal loading, as caused by thermal expansion, stress "lines" 11 develop in a criss-cross pattern. The intersections of these stress "lines" produce points 12 at which failure will occur, in the cylinder or rocket motor 10. By emphasizing the thermally induced stresses, a failure point is engineered into the construction of the rocket motor.

Figure 3:
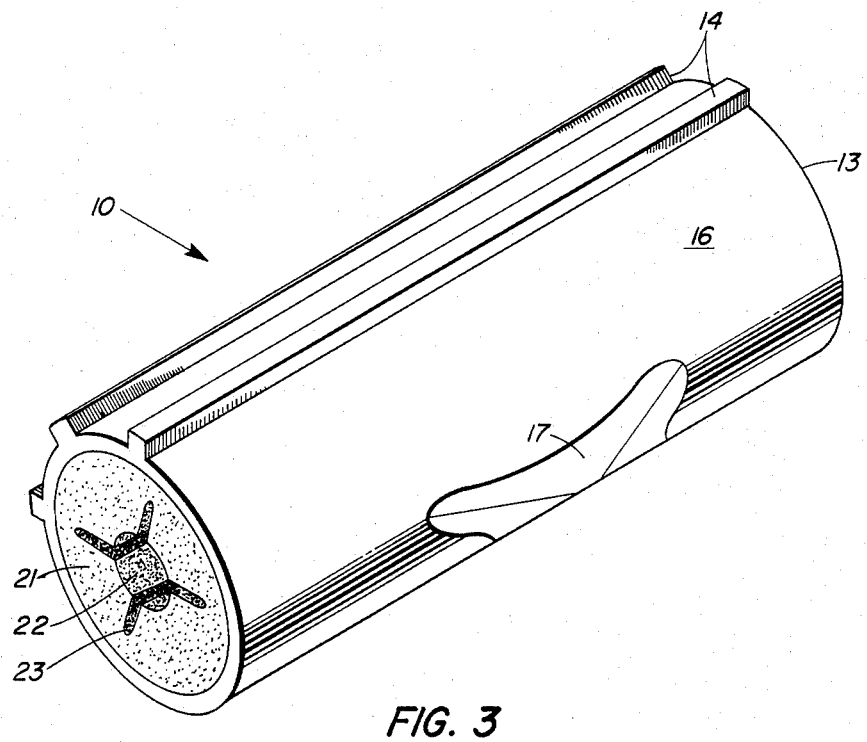
FIG. 3 is a view of the rocket motor.

Referring to FIG. 3, a rocket motor 10 is shown as including a cylindrical casing 13 constructed from steel or another suitable metal. Along the length of casing 13 run ribs 14 which, preferably, are unitarily constructed therewith as shown in FIG. 3 and are, therefore, fixedly connected to casing 13. Optionally, one large rib can be used in place of several smaller ribs. Ribs 14 are located over a predetermined portion of the rocket motor and serve to structurally strengthen or stiffen that portion of casing 13. As seen in FIG. 3, said portion is segmental in shape and extends axially of casing 13. This stiffening will help provide the compressional stress when thermal expansion results from heating. Other stiffening patterns may also be used. Various attachments and skirts connected to the rocket motor can provide additional stiffening by keeping portions of the metal cooler.

A coating 16 covers portions of the outside of rocket motor 10. The coating may be of an insulating paint or an intumescent material and should be reflective of fuel fire radiation to protect those portions of the motor from external heat. As shown in FIG. 3 a peripheral casing area or bare patch 17 is located opposite of ribs 14 on casing 13 and is, therefore, diametrically opposite of the casing from said portion thereof over which the ribs are located. As is apparent from FIG. 3, area 17 is, in a direction axially of casing 13, disposed centrally of said portion over which ribs 14 are located. It is also apparent from FIG. 3 that ribs 14 stiffen said portion against bending in a plane passing through said portion and patch 17. Area 17 does not receive any thermal coating protection. Alternatively, this area can be coated to be thermally absorptive to radiation to enhance differential heating. Any fire will most likely occur beneath the rocket motor. Bare patch 17 should be situated on the bottom or underneath side.

When rocket motor 10 undergoes external fuel fire heating, the stiffening or strengthening provided by ribs 14 along the top of casing 13, combined with bare patch 17 along the bottom of casing 13 will generate stress at a predetermined stress point.

FIG. 3 shows that casing 13 surround a mass of propellant of grain 21. As is conventional, grain 21 has a central void 22 with a plurality of radially extended slots 23. Four slots 23 are shown in this star grain, but any number of radial or longitudinal extensions may be used in accordance with good motor design techniques. The shape of void 22 controls combustion characteristics of the rocket motor. When ignition occurs along this void in a heat weakened motor, destructive explosion or combustion is likely unless venting is sufficient.

Bare patch 17 is preferably located, circumferentially of the casing, between a pair of the radial slots 23 as is apparent from FIG. 3, so that casing 13 will rupture at a stress point 11 in a small region between the radial slots. Then, grain 21 will be externally ignited on a small area and burn in a manner to torch a large hole in casing 13, before the grain burns through a slot 23 or void 22. The resultant venting can prevent interior pressure from reaching a dangerous level and causing explosive destruction.

The foregoing description taken together with the appended claims constitute a disclosure such as to enable a person skilled in rocket motor arts and having the benefit of the teachings contained therein to make and use the invention. Further the structure herein described meets the objects of the invention and generally constitutes a meritorious advance in the art unobvious to such a person not having the benefit of these teachings.

Obviously many modifications and variations of this invention are possible, and, it is therefore understood that within the scope of the disclosed inventive concept, the invention may be practiced otherwise than specifically described.

What is claimed is:

1. A rocket motor having a reduced likelihood of explosion in an external fire and comprising a cylindrical casing having a predetermined segmental portion extending axially along the casing and having a predetermined peripheral area which is disposed diametrically oppositely from said portion and is disposed centrally thereof in a direction axially along the casing; a thermally protective coating substantially covering the remainder of the periphery of the casing so that said area is thermally unprotected by the coating; a rib fixedly connected to said portion and extending therealong axially of the casing to stiffen said portion against bending in a plane passing through said portion and said area; and a propellant grain surrounded by the casing, so that when the casing is subjected to such a fire, stress is generated in the casing at said area to cause a rupture of the casing thereat.

2. The rocket motor of claim 1 wherein said area is covered with a thermally absorptive coating to enhance differential heating.

3. The rocket of claim 1 wherein the grain has a central void and a pair of slots extending radially therefrom, and the center of said area is disposed between said pair circumferentially of the casing so that the grain is externally ignitable between said pair at said rupture.

4. The rocket motor of claim 1 wherein the motor is most likely to be subjected to such external fire from a predetermined direction circumferentially of the casing, and said area is disposed in said direction.

* * * * *